(12) United States Patent
Bode et al.

(10) Patent No.: US 10,377,204 B2
(45) Date of Patent: Aug. 13, 2019

(54) RESCUE VEHICLE

(71) Applicant: Dräger Safety AG & Co. KGaA, Lübeck (DE)

(72) Inventors: Christian Bode, Belau (DE); Sven Neervoort, Siebenbäumen (DE); Kent Armstrong, Hillsdale (CA)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 24 days.

(21) Appl. No.: 15/523,436

(22) PCT Filed: Oct. 26, 2015

(86) PCT No.: PCT/EP2015/002118
§ 371 (c)(1),
(2) Date: May 1, 2017

(87) PCT Pub. No.: WO2016/066257
PCT Pub. Date: May 6, 2016

(65) Prior Publication Data
US 2017/0305231 A1 Oct. 26, 2017

(30) Foreign Application Priority Data
Oct. 30, 2014 (DE) .................. 10 2014 015 944

(51) Int. Cl.
*B60H 1/00* (2006.01)
*A62B 31/00* (2006.01)
(Continued)

(52) U.S. Cl.
CPC ......... *B60H 1/00414* (2013.01); *A62B 31/00* (2013.01); *A62C 27/00* (2013.01); *B60P 3/005* (2013.01)

(58) Field of Classification Search
CPC ... B60H 1/00414; A62B 31/005; B60P 3/005; A62C 27/00
See application file for complete search history.

(56) References Cited

U.S. PATENT DOCUMENTS 3,509,810 A 5/1970 Riester
2013/0264131 A1* 10/2013 Carney .................. A62B 31/00
180/9.42

FOREIGN PATENT DOCUMENTS

CH 44 3031 A 8/1967
DE 77 20 352 U1 12/1977
(Continued)

OTHER PUBLICATIONS

Photo of a 1975 Volvo F86 fire brigade vehicle obtained from the following website: http://www.oldaussievolvos.com/1975%20Volvo%20F86%20Alexander%20Perrie%20%20200%20527.jpg.

*Primary Examiner* — D Glenn Dayoan
*Assistant Examiner* — Melissa A Black
(74) *Attorney, Agent, or Firm* — McGlew and Tuttle, P.C.

(57) ABSTRACT

A rescue vehicle (2) includes a chassis (4), a drive unit (6) fastened to the chassis (4) and a driver's cab (8), which is fastened to the chassis (4). The chassis (4) is arranged behind the driver's cab (8) in a longitudinal direction L of the rescue vehicle (2). The rescue cab (10) has a gas-tight configuration. The rescue cab (10) has at least one door (12) as an access to the interior (14) of the rescue cab (10). The rescue vehicle (2) has an air supply unit (16), which is configured to supply the interior (14) of the rescue cab (10) with breathing air.

20 Claims, 2 Drawing Sheets

(51) Int. Cl.
*A62C 27/00* (2006.01)
*B60P 3/00* (2006.01)

(56) References Cited

FOREIGN PATENT DOCUMENTS

| | | | |
|---|---|---|---|
| DE | 87 05 838 U1 | 2/1988 | |
| DE | 92 14 412 U1 | 1/1993 | |
| DE | 94 03 123 U1 | 6/1994 | |
| DE | 299 23 339 U1 | 9/2000 | |
| DE | 10 2013 107 730 A1 | 1/2015 | |
| DE | 102014015944 A1 * | 5/2016 | ............ A62B 31/00 |
| FR | 775 683 A | 1/1935 | |
| FR | 775683 A * | 1/1935 | ............ A62B 31/00 |
| FR | 802 257 A | 9/1936 | |
| JP | 2011 037410 A | 2/2011 | |
| JP | 2013 237302 A | 11/2013 | |

\* cited by examiner

RESCUE VEHICLE

CROSS REFERENCE TO RELATED APPLICATIONS

This application is a United States National Phase Application of International Application PCT/EP2015/002118, filed Oct. 26, 2015, and claims the benefit of priority under 35 U.S.C. § 119 of German Application 10 2014 015 944.2, filed Oct. 30, 2014, the entire contents of which are incorporated herein by reference.

FIELD OF THE INVENTION

The present invention pertains to a rescue vehicle with a chassis, with a drive unit and with a rescue cab, which is fastened to the chassis and is arranged behind the driver's cab in a longitudinal direction of the rescue vehicle.

BACKGROUND OF THE INVENTION

Such rescue vehicles are known from the state of the art. They are used, for example, by the fire department to transport equipment and/or rescue personnel to the site of a mission. In case of above-ground use, the vehicle operation may have, for example, an internal combustion engine. This may, in principle, also apply to a rescue vehicle used for underground operation. In particular, drives having internal combustion engines with the lowest possible pollutant output are used for this purpose. As an alternative or in addition, the drive unit may have a hybrid engine. In addition or as an alternative, an electric motor may also be provided for the drive unit.

The driver's cab is provided primarily for the driver of the rescue vehicle. The usual configurations for steering the rescue vehicle are often provided for this.

In addition, the rescue vehicle has a rescue cab, which is fastened to the chassis. The chassis may also be called underframe. The rescue cab is configured as a unit separate from the driver's cab. It proved to be advantageous in practice if the rescue cab is arranged behind the driver's cab in the longitudinal direction of the rescue vehicle to offer unobstructed view for the driver in the driver's cab in the direction of travel. The rescue cab is used to transport persons who are necessary for offering aid in case of accidents or the like. In addition, the rescue cab may transport rescue equipment and/or other objects, which are necessary for a rescue mission.

There often is a higher risk potential in underground operations, especially in mining or in tunnel construction, because the escape possibilities are very limited for persons who work, for example, in mines. Therefore, specially configured escape possibilities are often provided in environments with high risk potential. These may be configured, for example, in the form of refuge chambers. If an emergency situation develops, the persons working in the mine can proceed to said refuge chambers in order to protect themselves from the risks mentioned. The persons often stay in these refuge chambers until the emergency situation is eliminated or until a rescue vehicle arrives in order to provide medical care for and/or rescue the persons in question.

Situations in which gases that are toxic for humans develop frequently develop in an emergency situation in underground operations. To protect persons located in underground operations when an accident or emergency situation develops, gas masks may be provided in the refuge chambers. To offer medical care for or rescue the persons in question, gas masks are usually provided for the persons of the rescue vehicle, i.e., for example, for the driver, who is in the driver's cab and steers the vehicle, as well as for the rescue persons, who are in the rescue cab.

It is known from the prior art that gas masks often make breathing difficult for the user of such a gas mask. The rescue persons of the rescue vehicle are subject to increased breathing efforts due to their use of gas masks on their way to the accident site.

It is, in addition, known from the prior art that gas masks have a limited maximum service life. Thus, the service life of a mask may be limited, for example, to several hours or to another duration. The remaining time during which the breathing mask can be safely used at the emergency site decreases due to the gas mask being used during the ride to the emergency site and during the ride from the emergency site to a safe location.

SUMMARY OF THE INVENTION

A basic object of the present invention is therefore to provide a rescue vehicle with which persons, who steer the rescue vehicle and/or are necessary for offering aid in an emergency situation in underground operations, can arrive at the emergency site preferably rapidly and with the lowest possible human effort.

Consequently, a rescue vehicle having a chassis, with a drive unit fastened to the chassis, a driver's cab fastened to the chassis, and a rescue cab fastened to the chassis, which is arranged behind the driver's cab in a longitudinal direction of the rescue vehicle, is provided, wherein the rescue cab has a gas-tight configuration, the rescue cab has at least one door for access to the interior of the rescue cab, and the rescue vehicle has an air supply unit, which is configured for supplying the interior of the rescue cab with breathing air.

A basic idea of the present invention is that the rescue persons, who get into the rescue cab and are then brought by means of the rescue vehicle to the emergency site, should not lose valuable time for putting on gas masks and for checking these for leaks before the start of the vehicle. This is achieved by the rescue persons being able to get immediately into the rescue cab and close the door mentioned, so that the rescue cab is gas-tight, after which the air supply unit is put into operation and the rescue vehicle can travel to the emergency site. The rescue persons can put on their gas masks and check them for leaks during the ride. In addition, unhindered communication can take place between the rescue persons up to the point in time at which the gas masks are put on. On arrival at the emergency site, the rescue persons can then leave the rescue cab through the door, with their masks put on, for example, in order to offer medical care for persons from a refuge chamber and/or for accompanying them from the refuge chamber into the rescue vehicle. If the persons to be rescued as well as the rescue persons are again in the rescue cab, the interior of the rescue cab can again be supplied with breathing air by means of the air supply unit, so that the interior of the rescue cab is preferably filled with breathing air after a short time. The gas masks of the rescue persons as well as of the persons to be rescued can then be removed. Due to the gas masks being used at least essentially only at the accident site, the maximum service life of the mask can be used for the mission at the accident site. In other words, there is no loss of service life due to the gas mask being worn during the transportation of the rescue persons in the rescue cab.

As soon as the interior of the rescue cab is filled with breathing air after picking up the persons to be rescued, the persons to be rescued can also remove the breathing masks they may possibly have been using. This is not infrequently relevant for the actual success of the rescue of the persons to be rescued, since medical care via the mouth and/or the nose can also take place only once the gas masks have been removed.

Air supply units are known, in principle, from the state of the art. Such an air supply unit may, for example, treat air and/or have a tank containing fresh air, so that the air supply unit can supply the interior of the rescue cab with breathing air. An exchange of the air volume in the interior of the rescue cab with the breathing air of the air supply unit is thus guaranteed. It was explained above that the rescue cab has a gas-tight configuration, especially when the door as access to the interior of the rescue cab is closed. Gas-tight means in this connection that the rescue cab has no opening through which gas can independently flow from the area surrounding the rescue cab into the rescue cab. In other words, the rescue cab is gas-tight against an area surrounding the rescue cab. This gas-tightness does not, however, rule out the possibility that the rescue cab has an outlet opening for liquids and/or for a gas, and such an opening is secured against the entry of gases. Moreover, the air supply unit may form a duct to the area surrounding the gas cab, but gases are prevented by the air supply unit from entering the interior of the rescue cab directly and in an untreated form from the area surrounding the rescue cab. The gases are therefore preferably defined as toxic gases and/or gases that are harmful for human beings.

A preferred embodiment of the rescue vehicle is characterized in that the air supply unit is associated with the rescue cab. In particular, the air supply unit is an integral part of the rescue cab. Air routing lines of the air supply unit can thus be kept especially short, which simplifies maintenance, on the one hand, and, in addition, increases the safety of such an air supply unit. In addition, an input unit for control, which is preferably likewise associated with the rescue cab and can especially preferably be operated from the interior of the rescue cab, may be provided for the air supply unit. Due to the air supply unit being associated with the rescue cab and/or due to the aforementioned control unit being associated with rescue cab, the rescue cab has an especially robust protection against external mechanical effects as they may occur, for example, due to falling rocks or other objects, because rescue cabs are often characterized by an outer protective wall. This protective wall can also protect the air supply unit from external effects. In addition to the protection from falling objects, the air supply unit may also be protected from other external effects, such as rain, chemicals or intense exposure to light.

Another preferred embodiment of the rescue vehicle is characterized in that the driver's cab has a gas-tight configuration. At least one door may be associated here with the driver's cab and used as an access to the interior of the driver's cab. Thus, the rescue vehicle has two cabs, which are separated from one another, namely, the driver's cab and the rescue cab, which have a gas-tight configuration each. When the rescue vehicle arrives at the emergency site, the rescue persons can exit the rescue cab through the door in order to perform medical care or other aid for persons at the emergency site. The driver in the driver's cab is not compromised by the fact that the other rescue persons get out of the rescue cab, since the two cabs are configured as cabs that are separated from one another. Moreover, the rescue cab is gas-tight and is thus protected from harmful gases from the surrounding area. Yet, there may be situations in which only the driver must get out of the vehicle. The rescue persons from the rescue cab may remain in the rescue cab in this case without being compromised by the action of the driver. In summary, an uncoupling, which makes the tasks of the persons from the respective cabs substantially more independent, can take place due to the gas-tight configuration of the two cabs.

Another advantageous embodiment of the rescue vehicle is characterized in that the air supply unit is configured, in addition, for supplying the interior of the driver's cab with breathing air. To drive to a rescue site, the driver of the rescue vehicle therefore does not necessarily need a gas mask since the interior of the driver's cab is supplied with breathing air. The driver, of course, may carry a gas mask with him in the cab for safety's sake and/or a gas mask may be provided for the driver in the cab. In addition, the steering of the rescue vehicle is made easier for the driver if he does not have to use a gas mask during the ride. Due to the same air supply unit being provided for the rescue cab and the driver's cab, the complexity of the rescue vehicle can be reduced. This facilitates the maintenance of the rescue vehicle.

Another preferred embodiment of the rescue vehicle is characterized in that the rescue vehicle has an air conditioner for air conditioning the interior of the rescue cab. If an emergency situation is caused, for example, by a fire, there may be a great increase in the ambient temperature in the area of the emergency site. To ensure optimal care for the persons affected by the emergency, the air conditioner is used for conditioning the air in the interior. The physical effort of the persons to be rescued can thus consequently be reduced once the person to be rescued has reached the interior of the rescue cab. In addition, the rescue cab can be used for the recovery of the rescue persons, who may possibly spend only a short time in the vicinity of the emergency site because of the high temperatures of a fire.

Another preferred embodiment of the rescue vehicle is characterized in that the air conditioner is associated with the rescue cab. It was already explained that the air supply unit may be associated with the rescue cab. An association of the air conditioner with the rescue cab leads to analogous effects and advantages, to which reference is analogously made in this connection.

A preferred embodiment of the rescue vehicle is characterized in that the air conditioner is configured, in addition, for air conditioning the driver's cab. The driver in the driver's cab can thus steer the rescue vehicle even in an area with higher ambient temperatures without the physical effort of the driver increasing greatly. In addition, the effects and advantages that were explained in connection with the air conditioning of the rescue cab apply insofar as they are applicable to the driver in the driver's cab.

Another preferred embodiment of the rescue vehicle is characterized in that the air supply unit and/or the air conditioner are supplied each with energy, especially electrical energy, of the drive unit. Thus, no separate energy source and/or a separate energy storage device is necessary for the air supply unit and for the air conditioner. The rescue vehicle can thus have an especially compact configuration to be used, last but not least, in tunnel construction, where the overhead clearance and/or the horizontal clearance may possibly be limited. The supply of the air supply unit and/or the air conditioner with energy of the drive unit may also be provided when the air supply unit is associated with the rescue cab and the air conditioner is associated with the rescue cab. Corresponding connection lines may be provided in this case.

Another preferred embodiment of the rescue vehicle is characterized in that a communication unit each is associated with the driver's cab and the rescue cab for communication between the rescue cab and the driver's cab. The communication units may be wired communication units or wireless communication units, especially radio communication units. The rescue persons in the rescue cab can communicate via the communication units with the driver in the driver's cab and vice versa in order to coordinate a rescue situation as best as possible.

Another preferred embodiment of the rescue vehicle is characterized in that the driver's cab and/or the rescue cab have a heat-resistant configuration. The wall of the driver's cab and of the rescue cab may have heat insulation each for this. This is especially useful if the rescue cab and/or the driver's cab are configured without air conditioning. As an alternative or in addition, the heat-resistance configuration may be provided for protecting the rescue persons and the driver from heat should the air conditioner fail.

Another preferred embodiment of the rescue vehicle is characterized in that a gas-measuring unit for monitoring gas in the interior of the rescue cab is associated with the rescue cab. Such a gas-measuring unit may be thus be fastened, for example, on an inner wall of the rescue cab. It is guaranteed with the monitoring of the interior of the rescue cab for gas, namely, preferably toxic gas and/or gas harmful for humans that the rescue persons in the rescue cab do not need to put on the gas masks and can be certain that there is no risk from a harmful gas in the interior of the rescue cab. In other words, the safety of the rescue persons in the interior of the rescue cab is increased with the gas-measuring unit.

A preferred embodiment of the rescue vehicle is characterized in that a door is provided in a rear wall of the rescue cab. As an alternative or in addition, a door may be provided in a roof wall of the rescue cab. A door in the rear wall and/or in the roof wall has proved to be especially advantageous in practice. The lateral areas of the rescue cab as well as the rear area of the rescue vehicle can be reached especially advantageously with a door in the rear wall. Due to the rescue persons being able to get in and get out through the door in the rear wall, the risk of the escape route being obstructed for the rescue vehicle by rescue persons is, in addition, reduced, because the rescue persons are preferably located behind the rescue vehicle because of the arrangement of the door. The door in the roof wall of the rescue cab offers an additional escape possibility should the rescue vehicle itself get into an emergency situation, especially if the door in the rear wall is blocked.

Another preferred embodiment of the rescue vehicle is characterized in that the rescue cab is configured as a module. The rescue vehicle can consequently have a module carrier, to which the rescue cab is detachably fastened as a module. Due to the modular configuration of the rescue cab, the rescue cab can be replaced by a rescue cab having an identical configuration or by a rescue cab that is different therefrom. This is especially advantageous in case of maintenance of the rescue cab and/or in case of repair of the rescue cab for the rest of the rescue vehicle being able to be continued to be used. This also applies conversely regarding the chassis with the drive unit of the rescue vehicle. Should repair and/or maintenance work have to be performed on this, the rescue cab can be used as a module for another rescue vehicle.

Another preferred embodiment of the rescue vehicle is characterized in that an outflow nonreturn valve is associated with a wall of the rescue cab. Air can flow through the outflow nonreturn valve in the flow direction from the interior of the rescue cab into an area surrounding the rescue cab. This embodiment often proved to be advantageous in practice when the air supply unit allows breathing air to flow into the interior of the rescue cab without using or otherwise removing a corresponding volume of air for this. Consequently, the pressure increases in the interior of the rescue cab with the feed of new breathing air. It is guaranteed by means of the outflow nonreturn valve that the pressure in the interior of the rescue cab rises only slightly, since the outflow nonreturn valve opens in the flow direction when a predefined pressure limit is reached and/or exceeded, so that air flows from the interior of the rescue cab into the surrounding area. The predefined pressure limit is preferably higher than the ambient pressure of the rescue cab. If the pressure in the interior of the rescue cab drops below the aforementioned pressure limit, the outflow nonreturn valve closes and stops the outflow of the air from the interior of the rescue cab. However, no volume flow of air can take place in the reverse order from the surrounding area into the interior of the rescue cab, since the valve is a nonreturn valve. This has a flow direction and a blocked direction. As was explained above, the air can flow and the valve can open in the flow direction when a certain pressure is reached or exceeded. The valve remains closed in the opposite direction even in case of changes in pressure.

An other preferred embodiment of the rescue vehicle is characterized in that the air supply unit has a fresh air storage device. A fresh air storage device offers an especially safe possibility of supplying the interior of the rescue cab with breathing air that is harmless for humans. The fresh air storage device may be checked and/or filled up at intervals, so that it is ensured in an emergency situation that the air supply unit can supply the interior of the rescue cab and the interior of the driver's cab with breathing air.

Another preferred embodiment of the rescue vehicle is characterized in that the air supply unit has an air regeneration device. An air regeneration device for the air supply unit proved to be especially advantageous in practice if a rescue mission with the rescue vehicle lasts especially long. Air from the interior of the rescue cab and/or from the area surrounding the rescue cab can be drawn in by means of the air regeneration device in order to subsequently purify or regenerate the air drawn in, so that the air regeneration device can provide breathing air.

Another preferred embodiment of the rescue vehicle is characterized in that the air supply unit has a harmful gas filter, especially a $CO_2$ filter. It can be ensured with a harmful gas filter in an especially simple manner that the air is filtered in order to filter out harmful gas before it enters the interior of the rescue cab. The harmful gas filter is used, in particular, to filter out carbon dioxide. Corresponding $CO_2$ filters are used for this. Other harmful gas filters may likewise be used.

Another preferred embodiment of the rescue vehicle is characterized in that an air intake duct is associated with the air supply unit in order to draw in air from the area surrounding the rescue cab. A site at which air with the lowest possible level of harmful substances is drawn in can especially advantageously be selected with the air intake duct. Thus, a corresponding duct opening may be directed downward in order not to draw in directly falling material, for example, rocks or dust. The effort needed for filtering the ambient air can consequently be reduced with the intake duct.

Another preferred embodiment of the rescue vehicle is characterized in that the interior of the driver's cab and/or the interior of the rescue cab is under overpressure. The overpressure is, for example, 1 mbar to 100 mbar. Air, especially air contaminated with harmful substances, is effectively prevented by the overpressure from entering the driver's cab or the rescue cab from the surrounding area. This is also true if a wall of the driver's cab and/or of the rescue cab has a slight leak and/or a small hole. The rescue cab is thus consequently especially safe.

Another preferred embodiment of the rescue vehicle is characterized in that the driver's cab and the rescue cab are made in one piece and/or form one unit. This proved to be advantageous for some applications.

Another preferred embodiment of the rescue vehicle is characterized in that the rescue vehicle has a self-supporting body with a corresponding chassis. This embodiment proved to be technically and economically advantageous in practice.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
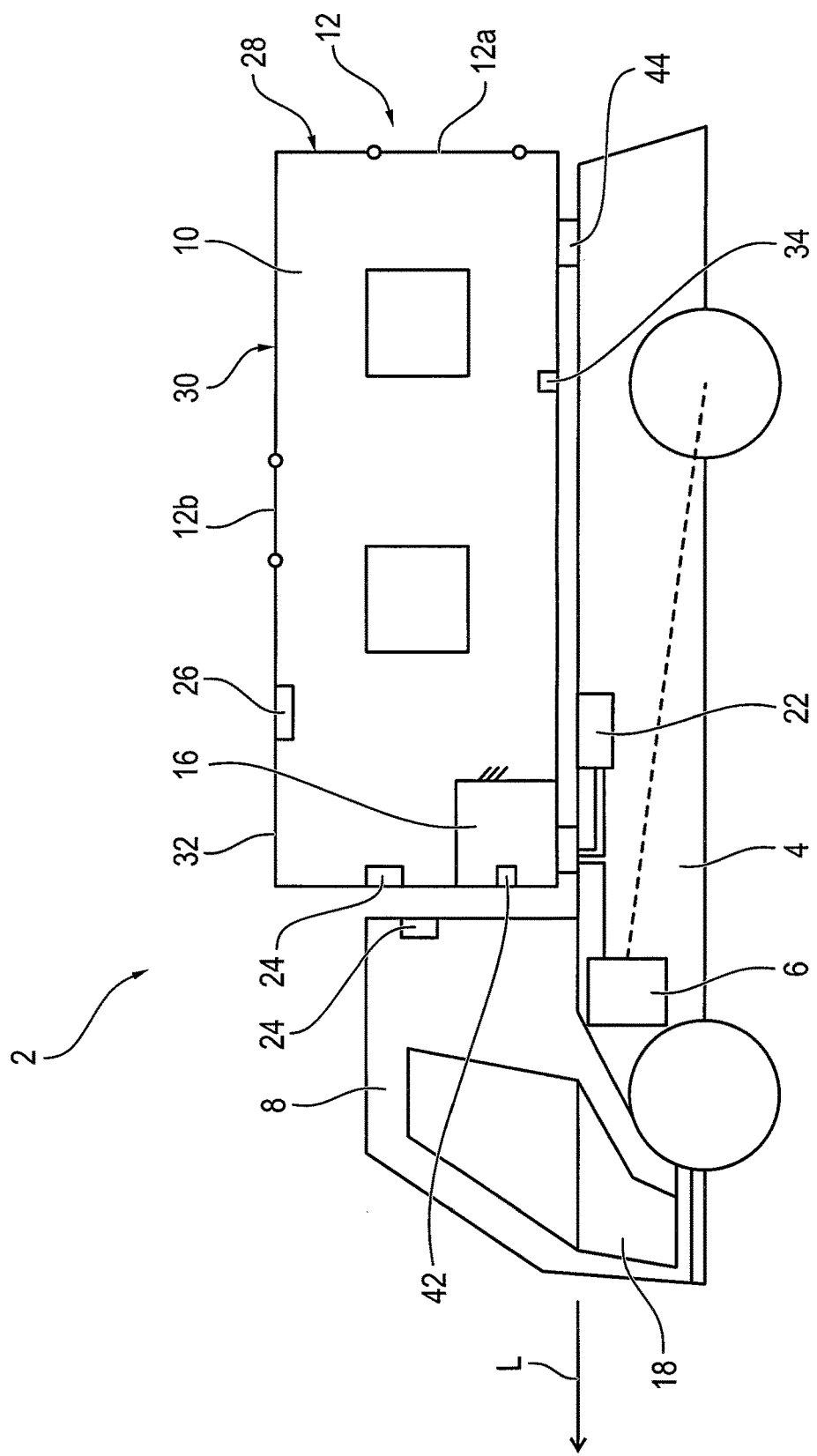
FIG. 1 is a schematic side view of the rescue vehicle according to the present invention.

Referring to the drawings, FIG. 1 shows a rescue vehicle (2). It is a motor vehicle. It has a chassis (4) and an associated drive unit (6). To make it possible to steer the rescue vehicle (2), a driver's cab (8) is provided, in addition, which is fastened to the chassis (4). The driver's cab (8) has the usual steering means, for example, a steering wheel.

In addition, the rescue vehicle (2) has a rescue cab (10). The rescue cab (10) is detachably fastened to the chassis (4) of the rescue vehicle (2). Connection devices (44), which are used to fasten the rescue cab (10) to the chassis (4) of the rescue vehicle (2), are preferably provided for this. It proved to be advantageous if the rescue cab (10) is configured as a module. The connection devices (44) act as module fastening means in this case. The rescue cab (10) can therefore be replaced with another rescue cab (10) according to the present invention. This is especially useful if a rescue cab (10) must be repaired and/or serviced. The rest of the rescue vehicle (2) can continue to be used in this case with the replaced rescue cab (10).

If an emergency situation develops, the rescue vehicle (2) is driven by a driver, who steers the rescue vehicle (2) in the driver's cab (8), and with additional rescue persons, who are in the rescue cab (10), to the emergency site. To make as stress-free breathing as possible for the rescue persons in the rescue cab (10), the rescue cab (10) has a gas-tight configuration. Moreover, an air supply unit (16), which is configured to supply the interior (14) of the rescue cab (10) with breathing air, is provided for the rescue vehicle (2). The rescue persons in the rescue cab (10) do not therefore need to put on gas masks on their way to the emergency site. It is only necessary to put on the gas masks when the rescue persons go through the at least one door (12) from the interior (14) of the rescue cab (10) and to the emergency site in order to provide medical care there and/or to pick up persons to be rescued in order to then bring them through the door (12) into the interior (14) of the rescue cab (10). If the door (12) of the rescue cab (10) is closed, so that the rescue cab (10) is again gas-tight, the interior (14) is again supplied with breathing air by the air supply unit (16), so that the air will preferably be replaced in the interior (14) of the rescue cab (10) after a short time. The rescue persons can then take off the gas masks and then care for the persons being rescued in the interior (14) of the rescue cab (10) with a reduced physical effort.

It was mentioned before that the rescue cab (10) is preferably designed as a module. It proved to be advantageous in this connection if the air supply unit (16) is associated with the rescue cab (10). The maintenance of the air supply unit (16) can also be performed in this case at the time of the maintenance of the rescue cab (10). Moreover, it proved to be advantageous to associate the air supply unit (16) with the rescue cab (10), because a rescue cab (10) is frequently protected from external mechanical impacts and/or other effects. A corresponding protection is therefore also offered for the air supply unit (16).

In order to prevent the driver in the driver's cab (8) from being possibly subjected to excessive physical effort on the way to the emergency site, provisions are made for the driver likewise not having to put on a gas mask during the trip. To achieve this, provisions are made for the driver's cab (8) to likewise have a gas-tight configuration. To supply the driver with breathing air, the air supply unit (16) may therefore also be configured for supplying the interior of the driver's cab (8). If the air supply unit (16) is associated with the rescue cab (10). corresponding line connections can lead from the air supply unit (16) to the driver's cab (8).

It may possibly happen that the temperature in the area directly surrounding the emergency site reaches a value that leads to a considerable physical effort for the rescue persons. This also applies to persons who are potentially to be rescued. Provisions are therefore made for the rescue vehicle (2) to have an air conditioner (22). The air conditioner (22) is now used to condition the air in the interior (14) of the rescue cab (10) and/or in the interior of the driver's cab (8). The rescue persons can thus proceed to the emergency site without being exposed to an elevated temperature from the surrounding area. In addition, the air conditioner (22) is used to improve a potentially poor condition of a person being rescued. If a person, for example, a person being rescued, is brought from the area surrounding the emergency site with an elevated temperature into the interior (14) of the rescue cab (10), said interior being air-conditioned, the temperature of the person being rescued can be stabilized.

When a door (12) of the rescue cab (10) is opened, there is a risk that harmful substances will enter the interior (14) of the rescue cab (10) from the area surrounding the rescue cab (10). Until the air has been replaced by the air supply unit (16), the rescue persons in the rescue cab (10) must have the gas masks put on. The point in time beginning from which the interior (14) is nonhazardous or at least essentially nonhazardous for rescue persons can be determined by means of a gas-measuring unit (26), which is arranged in the interior (14) of the rescue cab (10). The gas-measuring unit (26) may be configured for measuring harmful gases or other harmful substances. The gas-measuring device (26) is used, in particular, to detect carbon monoxide and/or carbon dioxide.

In addition, an outflow nonreturn valve (34) is provided for the rescue cab (10) and/or for the driver's cab (8) each. The purpose shall be explained as an example based on the rescue cab (10). If breathing air is caused to flow into the interior (14) of the rescue cab (10) by means of the air supply unit (16), the pressure would increase continuously in the interior (14) of the rescue cab (10). To avoid this, the outflow nonreturn valve (34) is provided for the rescue cab (10). Air can flow through this valve (34) from the interior (14) of the rescue cab (10) into the surrounding area. This is the flow direction of the outflow nonreturn valve (34). An air flow in the opposite direction through the outflow nonreturn valve (34) is not possible, however, because this causes the outflow nonreturn valve (34) to be closed. It is thus guaranteed that even though breathing air can flow from the interior (14) of the rescue cab (10) into the surrounding area, an opposite air flow into the interior (14) of the rescue cab (10) is effectively prevented. This guarantees a high level of safety for the breathing air in the interior (14) of the rescue cab (10). The rescue persons and/or the persons to be rescued are therefore especially well protected in the interior (14) of the rescue cab (10) against harmful substances in the air.

Figure 2:
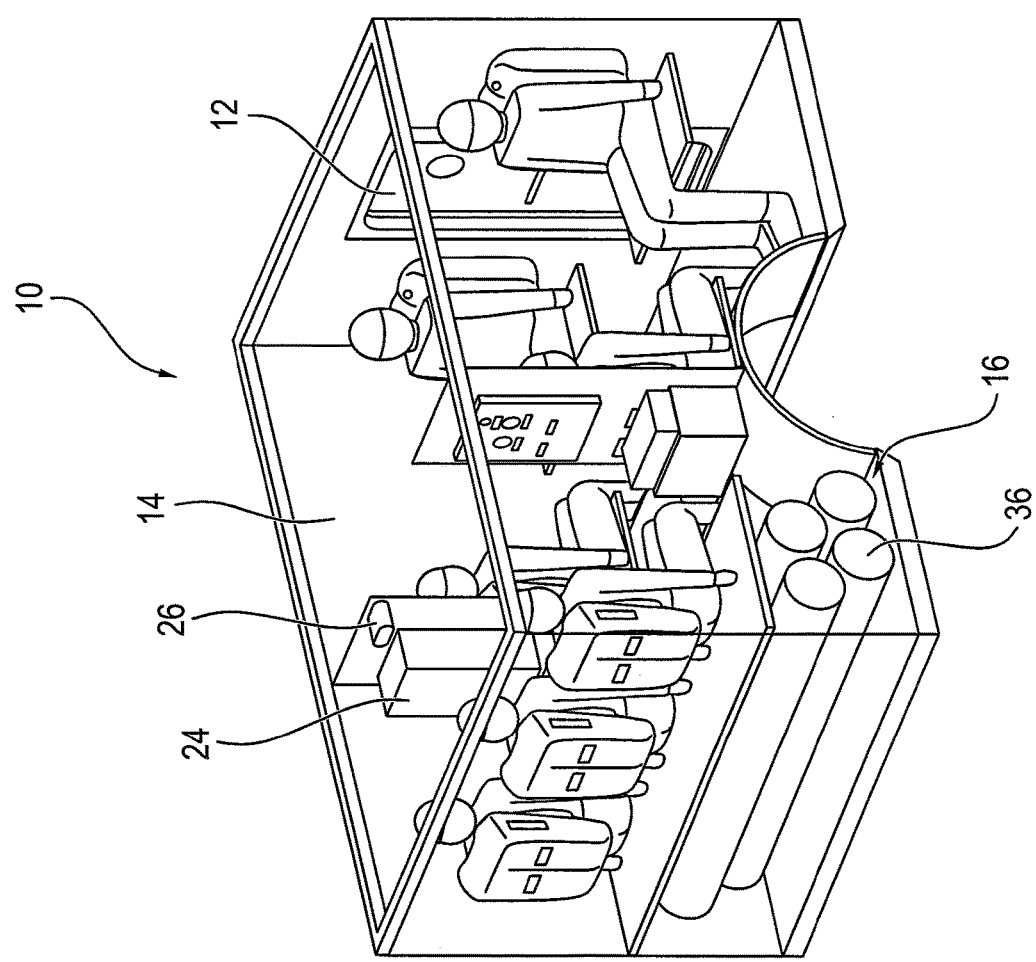
FIG. 2 is a schematic perspective view of the interior of the rescue cab.

To make breathing air available by means of the air supply unit (16), ambient air can be drawn in by means of the air supply unit (16) through an air intake duct (42) and then purified by means of a filter before the air supply unit (16) causes the corresponding, filtered air to blow as breathing air into the interior (14) of the rescue cab (10). As an alternative or in addition, the air supply unit (16) may have fresh air storage devices (36), as they can be seen, for example, in FIG. 2. Air can be caused in this case to flow as breathing air into the interior (14) of the rescue cab (10) from the fresh air storage device (36) by means of the air supply unit (16). The use of fresh air storage devices (36) has the advantage that the interior (14) of the rescue cab (10) can be supplied with nonhazardous breathing air, even if unknown harmful substances may at times be present in the area surrounding an accident site.

If the rescue persons in the rescue cab (10) have picked up the persons to be rescued into the rescue cab (10) and cared for them to the extent that the rescue vehicle (2) can leave the emergency site, a communication unit (24) is used, which is used for the communication between the rescue persons in the rescue cab (10) and the driver in the driver's cab (8). The communication unit (24) may be a wired and/or wireless, especially radio communication unit.

Two doors (12a, 12b) are preferably provided for the rescue cab (10) for access and/or as an escape route. One of the two doors may be provided on the rear wall (28) of the rescue cab (10). Such a door (12a) proved to be advantageous in practice to guarantee that the rescue persons are preferably located in the rear area and/or in the lateral area of the rescue vehicle (2). The rescue vehicle (2) can thus leave the emergency site by moving forward even when additional rescue vehicles are involved in the mission, without jeopardizing the rescue persons. In addition, a door (12b) may be provided in a roof wall (30) of the rescue cab (10). This door (12b) is used primarily as an escape door should the rescue vehicle (2) be involved in an accident.

While specific embodiments of the invention have been shown and described in detail to illustrate the application of the principles of the invention, it will be understood that the invention may be embodied otherwise without departing from such principles.

The invention claimed is:

1. A rescue vehicle comprising:
   a chassis;
   a drive unit fastened to the chassis;
   a driver's cab fastened to the chassis; and
   a rescue cab, which is fastened to the chassis and is arranged behind the driver's cab in a longitudinal direction of the rescue vehicle, wherein:
   the driver's cab and the rescue cab are configured as mutually separate cabs;
   the rescue cab has a gas-tight configuration;
   the rescue cab has at least one rescue cab door as an access to the interior of the rescue cab;
   the rescue vehicle has an air supply unit, which is configured for supplying the interior of the rescue cab with breathing air;
   the driver's cab has a gas-tight configuration and has at least one driver's cab door as an access to an interior of the driver's cab;
   the driver's cab is located outside an exterior of the rescue cab.

2. A rescue in accordance with claim 1, wherein the air supply unit is associated with the rescue cab, the rescue cab being fastened to a first area of the chassis, the driver's cab being fastened to a second area of the chassis, the first area being located at a spaced location from the second area.

3. A rescue vehicle in accordance with claim 1, wherein the air supply unit is configured, in addition, for supplying the interior of the driver's cab with breathing air, the interior of the driver's cab being sealed from the interior of the rescue cab.

4. A rescue vehicle in accordance with claim 1, further comprising an air conditioner for air conditioning the interior of the rescue cab, the driver's cab comprising a driver's cab housing defining at least a portion of the interior of the driver's cab, the driver's cab housing comprising a driver's cab housing exterior, the rescue cab comprising a rescue cab housing defining at least a portion of the interior of the rescue cab, the rescue cab housing comprising a rescue cab exterior surface, the driver's cab housing exterior surface being located at a spaced location from the rescue cab exterior surface.

5. A rescue vehicle in accordance with claim 4, wherein the air conditioner is associated with the rescue cab.

6. A rescue vehicle in accordance with claim 4, wherein the air conditioner is configured, in addition, for air conditioning the driver's cab.

7. A rescue vehicle in accordance with claim 1, wherein the air supply unit of the rescue cab and/or the air conditioner of the rescue cab is supplied with electrical energy of the drive unit, wherein an exterior of the driver's cab is completely arranged outside of the exterior of the rescue cab at a spaced location from the exterior of the rescue cab.

8. A rescue vehicle in accordance with claim 1, further comprising a communication unit associated with the driver's cab and the rescue cab each for communication between the rescue cab and the driver's cab, the interior of the driver's cab and the interior of the rescue cab being sealed such that the interior of the driver's cab is not in fluid communication with the interior of the rescue cab.

9. A rescue vehicle in accordance with claim 1, wherein the driver's cab and/or the rescue cab have a heat-resistant configuration.

10. A rescue vehicle in accordance with claim 1, further comprising a gas-measuring unit associated with the rescue cab for monitoring gas in the interior of the rescue cab.

11. A rescue vehicle in accordance with claim 1, wherein the rescue cab door comprises at least one of a door provided in a rear wall of the rescue cab and a door provided in a roof wall of the rescue cab.

12. A rescue vehicle in accordance with claim 1, wherein the rescue cab is configured as a module separate from the driver's cab, the rescue cab comprising a lower rescue cab passenger support surface for supporting at least one or more passengers in the rescue cab, the driver's cab comprising a lower driver support surface for supporting at least a driver in the driver's cab, the lower driver support surface being located at a spaced location from the lower rescue cab passenger support surface.

13. A rescue vehicle in accordance with claim 1, wherein an outflow nonreturn valve, through which air can flow in the flow direction from the interior of the rescue cab into an area surrounding the rescue cab, is associated with a wall of the rescue cab, wherein no fluid passes between the interior of the driver's cab and the interior of the rescue cab.

14. A rescue vehicle in accordance with claim 1, wherein the air supply unit has a fresh air storage device.

15. A rescue vehicle in accordance with claim 1, wherein the air supply unit has an air regeneration device.

16. A rescue vehicle in accordance with claim 1, wherein the air supply unit has a harmful gas filter.

17. A rescue vehicle in accordance with claim 1, wherein an air intake duct is associated with the air supply unit to draw in air from the area surrounding the rescue cab.

18. A rescue vehicle in accordance with claim 16, wherein the harmful gas filter comprises a $CO_2$ filter.

19. A rescue vehicle comprising:
a chassis;
a drive unit fastened to the chassis;
a driver's cab fastened to the chassis; and
a rescue cab, which is fastened to the chassis and is arranged behind the driver's cab in a longitudinal direction of the rescue vehicle, wherein:
the driver's cab and the rescue cab are configured as mutually separate cabs;
the rescue cab has a gas-tight configuration;
the rescue cab has at least one rescue cab door as an access to the interior of the rescue cab;
the rescue vehicle has an air supply unit, which is configured for supplying the interior of the rescue cab with breathing air;
the driver's cab has a gas-tight configuration and has at least one driver's cab door as an access to an interior of the driver's cab;
the interior of the rescue cab is not in fluid communication with the interior of the driver's cab.

20. A rescue vehicle comprising:
a chassis;
a drive unit fastened to the chassis;
a driver's cab fastened to the chassis; and
a rescue cab, which is fastened to the chassis and is arranged behind the driver's cab in a longitudinal direction of the rescue vehicle, wherein:
the driver's cab and the rescue cab are configured as mutually separate cabs;
the rescue cab has a gas-tight configuration;
the rescue cab has at least one rescue cab door as an access to the interior of the rescue cab;
the rescue cab has a rescue cab housing defining at least a portion of the interior of the rescue cab;
the rescue vehicle has an air supply unit, which is configured for supplying the interior of the rescue cab with breathing air;
the driver's cab has a gas-tight configuration and the drive's cab has at least one driver's cab door as an access to an interior of the driver's cab;
the driver's cab comprises a driver's cab housing defining at least a portion of the interior of the driver's cab;
each portion of the driver's cab housing is located external to the rescue cab housing.

* * * * *